May 31, 1960 J. J. B. LAIR 2,939,003
PULSE MODULATION DETECTOR CIRCUIT
Filed June 6, 1957 2 Sheets-Sheet 1
Fig. 1 (PRIOR ART)
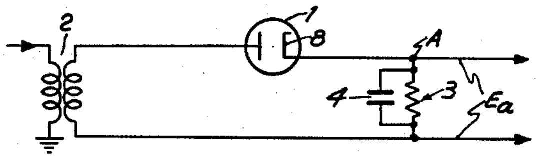
Fig. 2 (PRIOR ART)
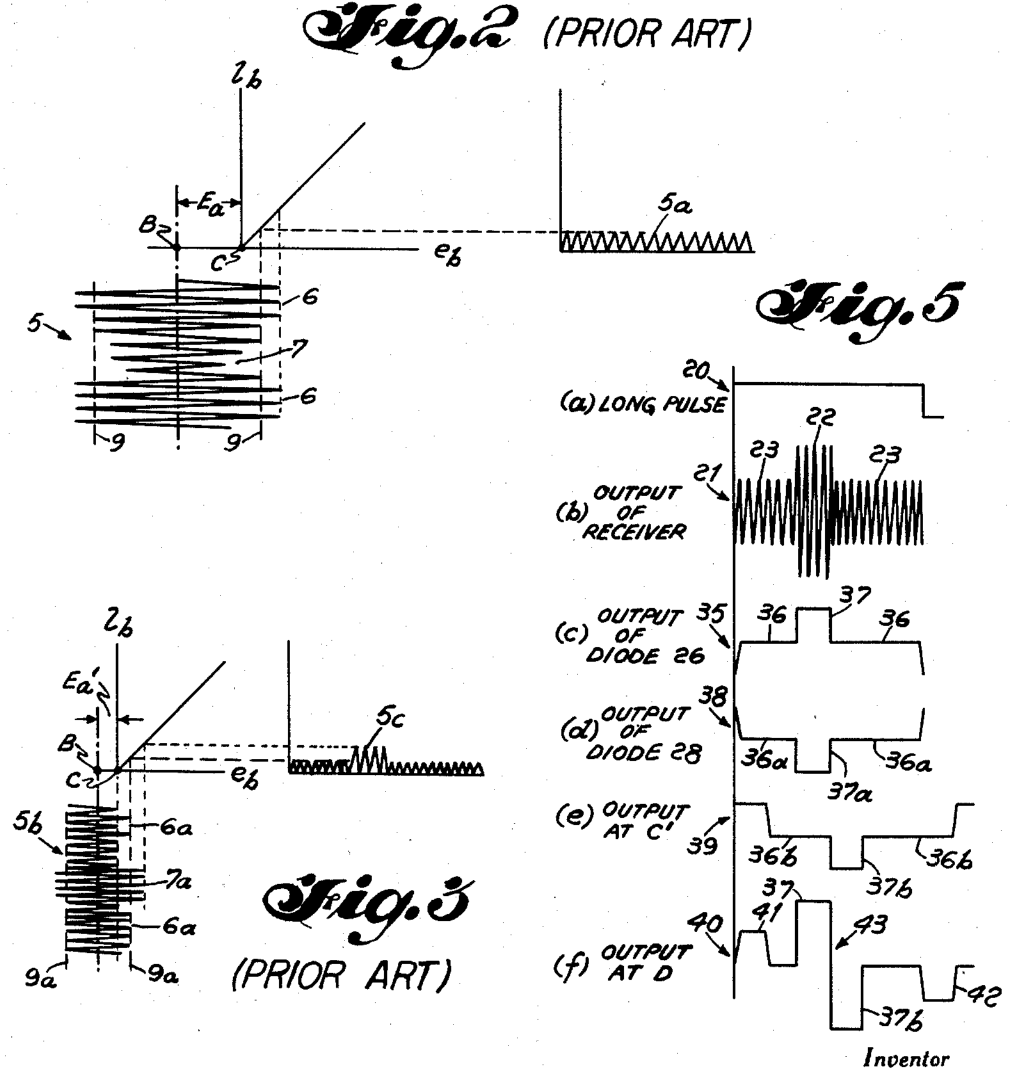
Fig. 2, Fig. 3 (PRIOR ART), Fig. 5
Inventor
JULIAN J. B. LAIR
By Percy P. Lantzy
Attorney Inventor
JULIAN J. B. LAIR
By Percy P. Lantzy
Attorney United States Patent Office 2,939,003

Patented May 31, 1960

2,939,003

PULSE MODULATION DETECTOR CIRCUIT

Julien J. B. Lair, Glen Ridge, N.J., assignor to International Telephone and Telegraph Corporation, Nutley, N.J., a corporation of Maryland Filed June 6, 1957, Ser. No. 664,887

1 Claim. (Cl. 250—27)

This invention relates to pulse detector circuits and more particularly to detector circuits used in pulse modulation radio systems such as radar.

The minimum usable signal that a radio receiver can deliver is determined by noise in the receiver output. The noise can be that which is picked up by the antenna from passing noise or static radio fields, thermal noise generated by the resistance that the antenna system presents to the input terminals of the receiver, a noise generated within the receiver consisting of circuit or thermal noise and tube noise. As far as noise is concerned the part of a radio receiver between the antenna and the output of the intermediate frequency amplifier can be regarded as an amplifier. The fact that the mixer of the receiver shifts the frequency of the noise does not change the situation in any significant manner; it merely causes the output noise to lie in a different place in the freqeuncy spectrum from the input noise. The receivers used in radar systems operating in the microwave region must deal with the weakest possible signals which may be comparable to or even weaker than the noise in the system. The level of atmospheric noise at these frequencies is very low so that it becomes necessary to do everything possible to reduce the internal noise in the receiver and to minimize losses in the input circuits. Considerable gain is then required to bring this noise level and signals that are comparable to it up to a usable level. Circuits have been devised to reduce the noise level and thus increase the signal-to-noise ratio. However, a circuit which reduces the effect of noise, however great its amplitude, upon the signal level would be a distinct improvement over the prior art.

It is therefore an object of this invention to reduce substantially the effect of noise in a radio receiver for pulse modulated signals.

It is a further object to improve the echo detection among noises of a radar receiver to increase its tracking ability.

A feature of this invention is a detector circuit by which radio frequency pulse modulated signals which are accompanied by noise signals are detected to obtain an output thereof in a first polarity, then by use of a delay device having a delay characteristic substantially equal to the width of the signal pulse a second output of the pulse signals and noise signal is obtained in a second polarity. These two outputs are then combined to produce a tandem pulse signal output substantially free from the noise signals, the first part of the tandem pulse corresponding to the signal pulse but of said first polarity and the second part of the tandem pulse corresponding also to the signal pulse but of said second polarity.

A further feature is the reduction of the bias on the detector circuit diodes by means of the substantial noise cancellation thereby maintaining the diodes at the best operating point for maximum signal detection.

The foregoing and other objects and features of this invention and the manner of attaining them will become more apparent and the invention itself will be best understood by reference to the following description of an embodiment of the invention taken in conjunction with the accompanying drawings, wherein:

Fig. 1 is a schematic diagram of a typical diode detector circuit;

Fig. 2 is a graph of the operating characteristics of the diode detector of Fig. 1 with one kind of input signals;

Fig. 3 is another graph of the operating characteristics of the diode detector of Fig. 1 with another form of input signals;

Fig. 5 is a graph of the waveforms of interest in the description of this invention.

Figure 4:
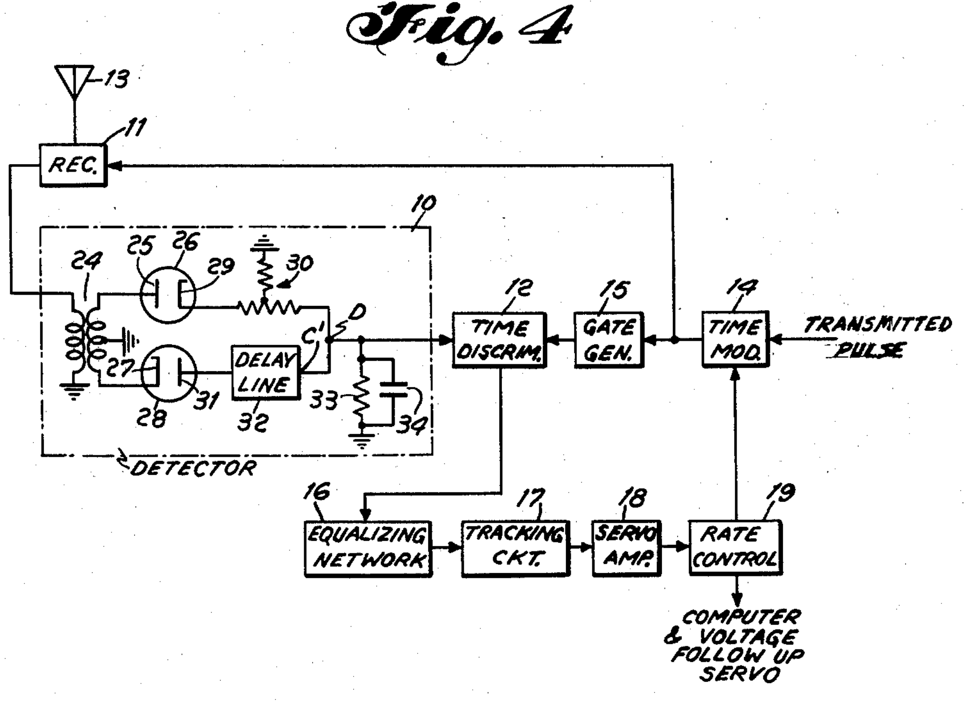
Fig. 4 is a block diagram and schematic of a portion of a radar system containing the detector circuit of this invention.

Referring now to Figs. 1, 2 and 3, there is shown a circuit of a typical diode detector with the intermediate frequency input signal applied to diode 1 through a coupling transformer 2. At the output of the diode is a resistor 3 and condenser 4. When a radar receiver is opened for the reception of echo signals, the intermediate frequency output will be of the character shown at 5 in Fig. 2 as the conglomerate signal consisting of noise signals 6 and the desired echo pulse 7. The signal 5 is deliberately chosen with the noise signals 6 of greater amplitude than the echo pulse 7. When the signal 5 is applied across the diode 1 through the coupling transformer 2, a component of direct current will flow through resistor 3. The voltage across the diode 1 will therefore consist of a radio frequency component of voltage produced by the intermediate frequency signal and a direct current component of voltage set up across the resistor 3. The direction of flow in the resistor 3 will be such as to make the end of the resistor farthest from the cathode 8 of the diode 1 at a negative postential $E_a$ with respect to the cathode 8. The resultant current flow through the diode will therefore be similar to that shown at 5*a*. Since the noise signals 6 are of constantly varying amplitude, we may assume an average amplitude for the noise signal during the signal 5 duration similar to that shown by the broken line 9. Thus, as the signal 5 is applied to the diode 1 and the positive portion of the noise signal 6 passes through the diode, a positive voltage $E_a$ will appear at point A and will remain there for the duration of the signal 5. In effect, the voltage $E_a$ constitutes a positive bias on the cathode 8 of diode 1 shifting the operating point of the diode 1 to point B in Fig. 2. No resultant signal will appear at A as long as this positive bias is present unless the signal is greater than $E_a$. It is evident that the amplitude of echo pulse 7 of signal 5 being smaller than $E_a$, it will not appear at the output of the diode 1. In Fig. 3 a signal 5*b* is shown with the noise component 6*a* smaller in amplitude than the echo pulse 7*a*. The positive bias $E_a$ at A developed by the noise signals 6*a* are insufficient to prevent the pulse 7*a* from appearing at the output of the diode 1 as shown at 5*c* though reduced in amplitude from the value of the input to the diode 1. The smaller the amplitude of the noise signal appearing in the intermediate frequency signal output, the smaller will be the value of $E_a$ and the operating point of the diode will approach the ideal operating point C.

In Fig. 4 there is shown a part of a radar system such as substantially described on page 358 in the publication "Electronic Time Measurements," volume 20 of the Massachusetts Institute of Technology Radiation Laboratories series published by McGraw-Hill Book Company, Inc. which has been modified to include the present invention. The detector circuit 10 of Fig. 4 enclosed within the broken line comprises the preferred embodiment of this invention, and as shown it couples the receiver 11 to a time discriminator 12. The receiver 11 includes the usual radio frequency mixer and intermediate frequency sections and is coupled to the antenna 13 and a time modulator 14. The output of the time discriminator 12 is applied to an equalizing network 16 which is coupled to tracking circuits 17. A servo amplifier 18 couples the tracking circuits 17 to a rate control 19. The output of the rate control 19 is coupled to a computer and a voltage follow-up circuit not shown and also to the modulator 14. The transmitted pulse is applied to the time modulator for synchronizing and tracking purposes. The time modulator 14 produces a gating or long pulse 20 shown in curve *a* of Fig. 5, delayed in time from the transmitted pulse. This pulse 20 is fed to the receiver 7 and renders it responsive to the echoes occurring at the time of the duration of the long pulse 20. The output of receiver 11 is the intermediate frequency signal 21, curve *b* of Fig. 5, which is of the same duration as the long pulse 20 and consists of the echo pulse 22 and the noise signals 23 and is applied to the detector circuit 10 through the coupling transformer 24. The in phase signal 21 is fed to the plate 25 of a first diode tube 26 and the 180 degree out-of-phase signal 21 is applied to the cathode 27 of a second diode 28. The cathode 29 of diode 26 is connected to a resistive network 30. The plate 31 of the diode 28 is connected to a delay line 32. The outputs of the resistive network 30 and the delay line 32 are combined at D to which is connected a resistor 33 and a by-pass condenser 34.

The intermediate frequency in phase signal 21 after passing through the diode 26, emerges as the positive signal 35 in curve *c* of Fig. 5. Portions 36 of signal 35 are the average rectified noise signals 23 of signal 21. Pulse 37 is the rectified pulse signal 22 of signal 21. Curve *d* of Fig. 5 shows the negative rectified output 38 of the diode 28, which is the mirror image of the signal 35. The output of the delay line 32 is the signal 39. The delay line 32 is designed to have a delay time equal to the pulse width of echo pulse 37. The resistive network 30 is designed to attenuate the signal 35 by the same amount of attenuation that the signal 38 undergoes when it passes through the delay line 32. It is apparent that one skilled in the art can determine the necessary values of the resistors in the network 30 knowing the attenuation characteristics of the delay line 32. Therefore, when the signals 35 and 39 are combined at D, the resultant signal 40 will consist of a short positive noise portion 41, a short negative noise portion 42 representing the resultant of positive averaged noise signal 36 and negative averaged delay signal 36*b*, and a tandem pulse 43 consisting of the positive echo pulse 37 and the negative delayed echo pulse 37*b*. The rectified noise signals 36 and 36*a* have been cancelled out except for the two short signals 41 and 42. There is therefore no continuous bias at point D except for very short intervals at the beginning and end of the signal 21. The operating points of the diodes 26 and 28 are now shifted to the right to the theoretically correct point C of Fig. 2. The amplitude of the tandem pulse signal 43 is substantially unattenuated and the noise at and closely adjacent the signal pulse has been eliminated.

The tandem pulse 43 is transmitted to the time discriminator 12 which receives a short gating or tracking pulse generated by the gate generator 15 and compares the two pulses. If the gating pulse falls within the positive portion of the tandem pulse 43, a positive error voltage results that indicates that the gating pulse is lagging the echo tandem pulse 43 while a negative error voltage would indicate that the gating pulse is leading the echo tandem pulse 43. The coincidence of the gating pulse with the middle of the tandem pulse 43 produces no error voltage and indicates that the radar tracking is on the target from which the echo emanates.

In the prior art using the conventional diode detector which has a positive pulse output, it is necessary to convert this positive pulse to an S-shaped pulse by means of an S curve generator or pulse transformer to enable the gating pulse to sample the S-shaped pulse in the time discriminator 12. This invention eliminates the need for the S curved generator since the output of the detector 10 is the tandem pulse 43.

Figure 6:
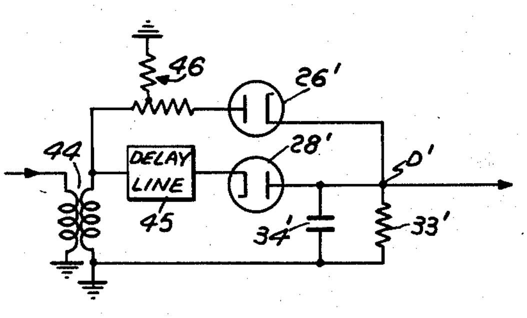
Fig. 6 is another embodiment of this invention.

The detector circuit embodiment of Fig. 6 will produce the same result as detector circuit 10. The output of an unbalanced coupling transformer is fed to a delay line 45, with a delay equal to pulse width 37, and a resistive network 46 which will attenuate the signal 27 by the same amount of attenuation that it undergoes when passing through the delay line 45. The output of the resistive network 46 is coupled to diode 26′ and the output of delay line 45 is fed to diode 28′. The outputs of diode 26′ and 28′ when combined at D′ will produce the resultant signal 40.

While the use of only one diode in conjunction with a reflection delay line may be used in the place of circuit 10, the amplitudes of the incident and reflected pulses are not equal and therefore complete noise cancellation at and closely adjacent the signal pulse is not obtained. This form may be satisfactory in some circuits but where better noise elimination is required the circuit with two diode tubes is to be preferred.

While I have described above the principles of my invention in connection with specific apparatus, it is to be clearly understood that this description is made only by way of example and not as a limitation to the scope of my invention as set forth in the objects thereof and in the accompanying claim.

I claim:

A detector circuit for radio frequency pulse modulated signals wherein said pulse signals are accompanied by noise signals comprising a transformer, means coupling said pulse modulated signals to the input of said transformer, a first diode, means coupling the output of said transformer containing said pulse and noise signals in phase to the plate of said first diode to obtain as a first output of said first diode a first detected signal of a first polarity, a second diode, means coupling the output of said transformer containing the pulse and noise signals 180 degrees out of phase with said in phase signals to the cathode of said second diode to obtain as the output of said second diode a second detected signal corresponding to said first detected signal but of a polarity opposite to said first polarity, delay means having a time delay substantially equal to the duration of said pulse signal, means coupling said delay means to the output of said second diode, resistive means coupled to the output of said first diode to attenuate said first detected signals by an amount equal to the attenuation of said second detected signal in said delay means, means to combine the attenuated output of said first diode and said delay means to obtain a tandem pulse signal substantially free from said noise signals, said tandem pulse signal having one portion of said first polarity and a second portion of said opposite polarity.

References Cited in the file of this patent

UNITED STATES PATENTS

| | | |
|---|---|---|
| 2,310,692 | Hansell | Feb. 9, 1943 |
| 2,450,352 | Piety | Sept. 28, 1948 |
| 2,502,454 | Grieg | Apr. 4, 1950 |
| 2,530,035 | Watt | Nov. 14, 1950 |
| 2,837,644 | Shallon | June 3, 1958 |
| 2,874,217 | Diehl | Feb. 17, 1959 |

FOREIGN PATENTS

| | | |
|---|---|---|
| 141,504 | Australia | May 27, 1948 |